(12) United States Patent
Sward

(10) Patent No.: US 7,014,224 B1
(45) Date of Patent: Mar. 21, 2006

(54) FLUID LINE CONNECTOR

(75) Inventor: Peter John Sward, Collinsvale (AU)

(73) Assignee: Optimum Innovations Australia, (AU)

( * ) Notice: Subject to any disclaimer, the term of this patent is extended or adjusted under 35 U.S.C. 154(b) by 0 days.

(21) Appl. No.: 09/958,037

(22) PCT Filed: Apr. 6, 2000

(86) PCT No.: PCT/AU00/00287

§ 371 (c)(1),
(2), (4) Date: Apr. 11, 2002

(87) PCT Pub. No.: WO00/60268

PCT Pub. Date: Oct. 12, 2000

(30) Foreign Application Priority Data

Apr. 6, 1999 (AU) .................................. PQ3936

(51) Int. Cl.
*F16L 19/00* (2006.01)
(52) U.S. Cl. .................. 285/354; 285/319; 285/332.1; 285/332.2
(58) Field of Classification Search ................ 285/319, 285/330, 332.1, 332.2, 334.1, 354, 913, 914
See application file for complete search history.

(56) References Cited

U.S. PATENT DOCUMENTS

| | | | |
|---|---|---|---|
| 2,829,673 A * | 4/1958 | Reese ........................... | 138/44 |
| 2,863,678 A * | 12/1958 | Gordon et al. ........... | 285/332.1 |
| 3,459,442 A * | 8/1969 | Johnson et al. ............... | 285/27 |
| 3,887,222 A | 6/1975 | Hammond | |
| 4,753,268 A | 6/1988 | Palau | |
| 4,801,160 A * | 1/1989 | Barrington .................... | 285/81 |
| 4,820,288 A * | 4/1989 | Isono .......................... | 604/534 |
| 4,993,755 A | 2/1991 | Johnston | |
| 5,031,266 A * | 7/1991 | Tillman et al. ............ | 15/327.2 |
| 5,215,336 A | 6/1993 | Worthing | |
| 5,219,188 A * | 6/1993 | Abe et al. ..................... | 285/93 |
| 5,263,312 A | 11/1993 | Walker et al. | |
| 5,362,110 A | 11/1994 | Bynum | |
| 5,380,019 A * | 1/1995 | Hillery et al. .............. | 277/626 |
| 5,542,712 A | 8/1996 | Klinger et al. | |
| 5,626,371 A | 5/1997 | Bartholomew | |
| 5,772,643 A * | 6/1998 | Howell et al. .............. | 604/533 |
| 5,860,677 A | 1/1999 | Martins et al. | |
| 5,882,042 A * | 3/1999 | Lacoste ....................... | 285/18 |
| 5,924,747 A | 7/1999 | Miyashita | |

FOREIGN PATENT DOCUMENTS

| | | |
|---|---|---|
| AU | 17951/76 | 4/1978 |
| AU | 48611/93 | 3/1994 |

(Continued)

*Primary Examiner*—James M. Hewitt
(74) *Attorney, Agent, or Firm*—Stites & Harbison PLLC; Marvin Petry

(57) ABSTRACT

A fluid line connector for connecting first and second fluid lines, having: a male portion (12) having a generally frusto-conical nozzle (22); a female portion (14) having a complementary generally frusto-conical recess (46) for receiving the nozzle (22); and a coupling (16) for coupling the male portion (12) and the female portion (14) when the nozzle (22) is received by the recess (46); whereby the fluid lines (72, 74) can be connected by attaching the male portion (12) to the first fluid line and the female portion (14) to the second fluid line, and locating the nozzle (22) within the recess (46) to form only circumferential sealing engagement between the nozzle (22) and the recess (46), and coupling the male and female portions (12, 14) by means of the coupling (16).

1 Claim, 6 Drawing Sheets

FOREIGN PATENT DOCUMENTS

| | | |
|---|---|---|
| AU | 16413/95 | 10/1995 |
| AU | 30654/95 | 3/1996 |
| AU | 32955/95 | 4/1996 |
| AU | 43338/96 | 8/1996 |
| DE | 4 318 101 | 12/1994 |
| EP | 0 240 452 | 10/1987 |
| FR | 1 221 842 | 6/1960 |
| FR | 2 263 449 | 10/1975 |
| WO | WO-89/06766 | 7/1989 |
| WO | WO-97/23704 | 7/1997 |
| WO | WO-97/24545 | 7/1997 |

* cited by examiner

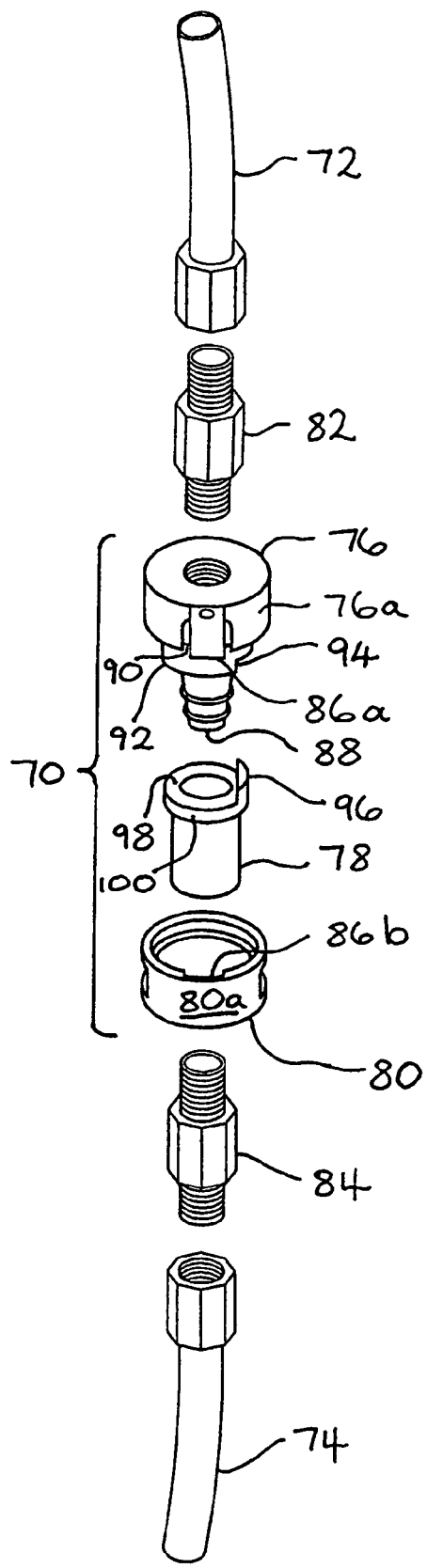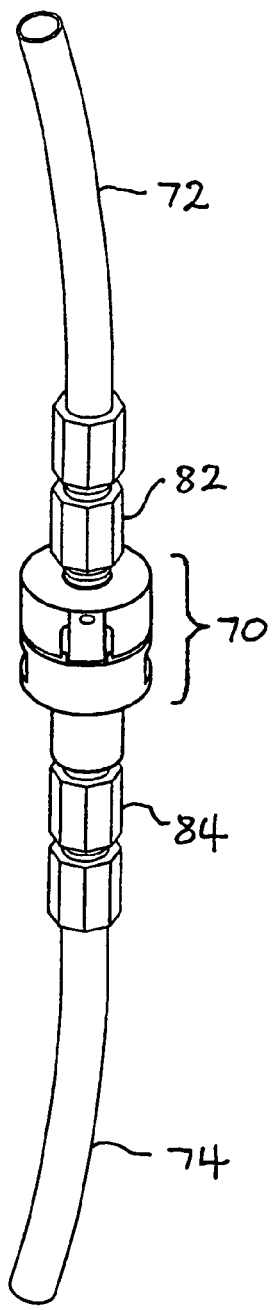
FIGURE 8A
FIGURE 8B

FLUID LINE CONNECTOR

The present invention relates to a connector for fluid lines, of particular but by no means exclusive application to liquid lines such as a paint line.

There exist many connectors for fluid lines employing a diverse range of connection methods. For example, one common connector comprises an externally threaded section of pipe for coupling to the end of one fluid line, and a corresponding unthreaded portion of pipe attaching to the end of a further fluid line. The latter portion is also provided with a retainable and internally threaded slip ring. A connection is formed by abutting the two portions, which are then held together firmly to form a fluid-tight seal by screwing the slip ring onto the first portion. This form of connector is commonly used for connecting liquid lines. Another existing fluid line connector includes a pair of flanges, one attached to each of a two fluid lines to be connected. Each flange is provided with a series of apertures so that, when the flanges are located against one another, they may be held in sealing engagement by means of bolts located in these apertures. A washer, O-ring or other seal is preferably located between the flanges. For gaseous fluids this seal may be an O-ring or a metal seal (of copper, aluminium or the like).

The latter existing connector forms a very secure connection, owing to the use of connection bolts. However, in many applications it is adequate, and considerably more convenient, to use the former connector described above, as it may be more quickly coupled and decoupled. However, while connectors of this type are often more convenient and adequate for pressures even as high as 150 MPa or more, when used with certain fluids—particularly highly viscous fluids or those, such as paint, that may set and adhere to the connector—may be difficult to disconnect. For this reason, such connectors are commonly adapted for connection and disconnection with a wrench, spanner or the like, but this thereby usually requires the user to handle the connector and the appropriate tool simultaneously, adding additional inconvenience and awkwardness to the connection or disconnection of the fluid lines. For this reason they are also time consuming to connect and disconnect. Further, the threaded portions of such a connector are vulnerable to becoming coated in the fluid carried by the line: this can produce undesirable mess on the connector and, as a result, the user.

It is an object to the present invention, therefore, to provide a fluid line connector that provides both an acceptable connection over a range of pressures and convenient coupling and decoupling.

The present invention provides, therefore, a fluid line connector for connecting first and second fluid lines, having:
- a male portion having a generally frusto-conical nozzle;
- a female portion having a complementary generally frusto-conical recess for receiving said nozzle; and
- coupling means for coupling said male portion and said female portion when said nozzle is received by said recess;
- wherein said nozzle has an outer surface with a plurality of annular grooves each provided with or for receiving one or more O-rings that, when located in said grooves, have outer edges lying in a common generally frusto-conical surface complementary to said recess, for facilitating sealing between said nozzle and said recess;
- whereby said fluid lines can be connected by attaching said male portion to said first fluid line and said female portion to said second fluid line, locating said nozzle within said recess to form only circumferential sealing engagement between said nozzle and said recess, and coupling said male and female portions by means of said coupling means.

Preferably said coupling means comprises a slip ring.

Preferably said slip ring has an internally threaded portion and said male portion of said connector is at least partially, externally threaded for threadedly engaging said internally threaded portion of said slip ring, and said female portion of said connector has a flange for engaging an abutment provided on said slip ring.

Preferably said coupling means is provided externally with a anti-slip surface for facilitating gripping by user. Preferably said anti-slip surface comprises cross-hatching.

Preferably said coupling means includes spanner or wrench flats for engagement and operation by a spanner or wrench.

Preferably said flats are uni-directional for decoupling engagement with said spanner or wrench only.

Thus, as a spanner or wrench cannot conveniently be used to couple the connector, the risk of over-tightening the connector is reduced or eliminated while a spanner or wrench may still be used to decouple the connector.

Preferably the connector includes locking means to prevent or inhibit the relative rotation of said male and female portions during coupling, decoupling and/or use.

Preferably the locking means includes a boss or pin provided on one of said male and female portions, and one or more complementary bores or recesses provided on the other of said male and female portions for receiving said boss or pin when said frusto-conical nozzle is located in said frusto-conical recess.

Preferably the locking means comprises a projection provided on one of said male and female portions and a complementary recess or cut-away provided on the other of said male and female portions, whereby said projection is received by said recess or cut-away when said male and female portions are engaged to thereby to prevent or inhibit the relative rotation of said male and female portions during coupling, decoupling and/or use.

Preferably the connector includes further locking means for resisting the undesired or accidental uncoupling of said coupling means and therefor said connector.

This further locking means can be any suitable means, such as a lock nut or, when the coupling means is threaded, a modified portion of that thread.

In another aspect of the invention, there is provided a fluid line connector for connecting first and second fluid lines, comprising:
- a male portion having a generally frusto-conical nozzle;
- a female portion having a complementary generally frusto-conical recess for receiving said nozzle;
- a slip ring for coupling said male portion and said female portion when said nozzle is received by said recess; and
- locking means for resisting the undesired or accidental uncoupling of said slip ring and therefore said connector;
- whereby said fluid lines can be connected by attaching said male portion to said first fluid line and said female portion to said second fluid line, locating said nozzle within said recess to form only circumferential sealing engagement between said nozzle and said recess, and coupling said male and female portions by means of said slip ring;
- wherein said locking means includes a leaf spring provided on said male portion and a complementary recess provided on said slip ring, whereby said recess receives said spring when said male portion and said female portions are coupled by means of said slip ring and thereby inhibits the relative rotation of said slip ring with respect to said male portion.

Preferably the recess is provided in an inner wall of said slip ring.

In order that the present invention may be more clearly ascertained, a preferred embodiment will now be described, by way of example, with reference to the accompanying drawing in which:

FIG. 8A is an exploded view of a paint line connector according to a further preferred embodiment of the present invention, shown with first and second paint lines; and FIG. 8B is an assembled view of the paint line connector and first and second paint lines of FIG. 8B.

Figure 1:
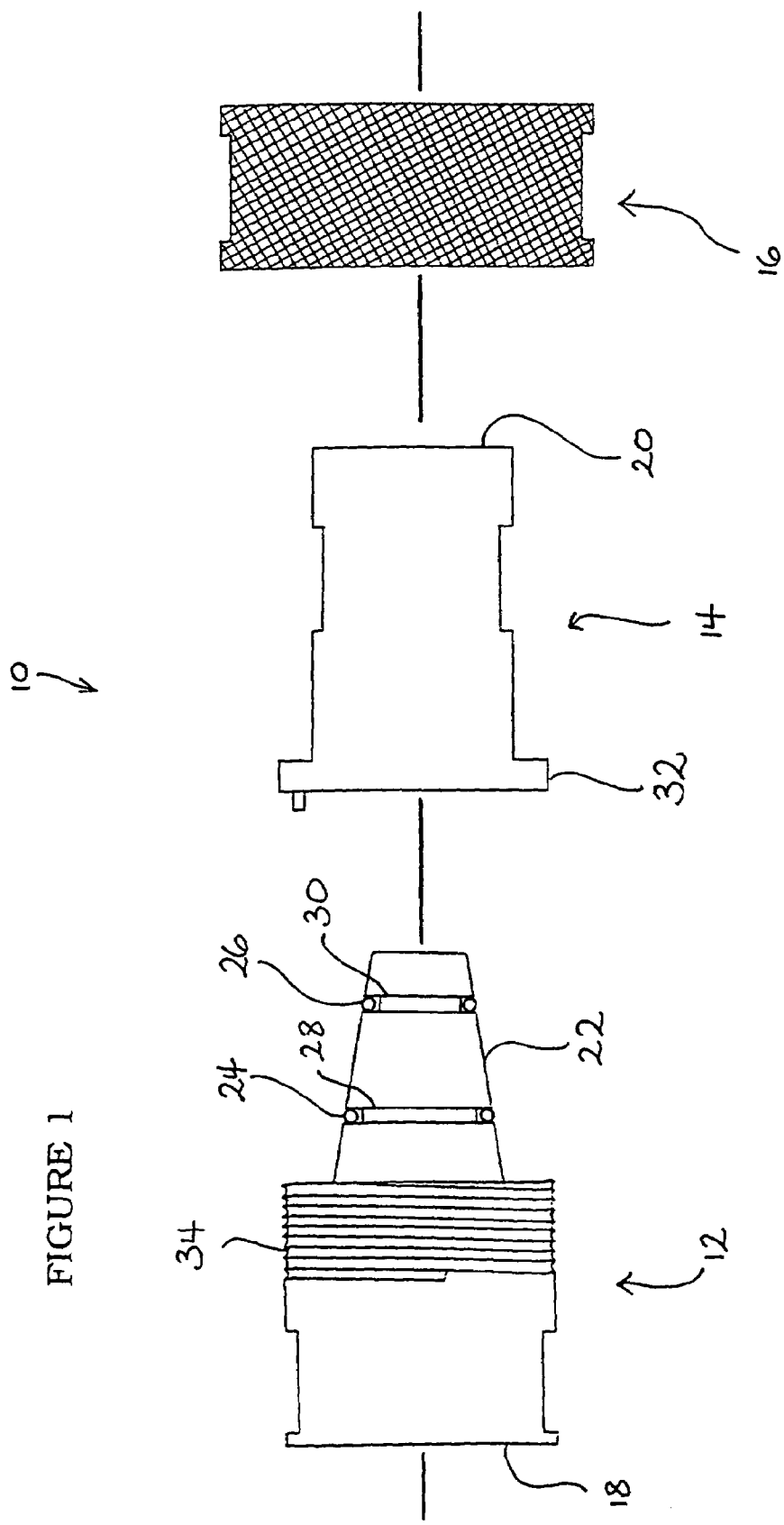
FIG. 1 is a view of a paint line connector according to a preferred embodiment of the present invention.

A paint line connector according to a preferred embodiment of the present invention is shown generally at 10 in FIG. 1. The connector 10 includes male portion 12, female portion 14 and a coupling means in the form of slip ring 16. The rear end 18 of male portion 12 and the rear end 20 of female portion 14 are internally threaded for coupling in each case to an end of a paint line (generally provided with a threaded nipple). The male portion 12 includes a frusto-conical nozzle 22 provided with two O-rings 24 and 26 located in suitable annular recesses 28 and 30 respectively. Nozzle 22 is receivable by a corresponding frusto-conical recess (not shown) in female portion 14, and—in use—the two portions 12 and 14 are coupled together by means of slip ring 16. Slip ring 16, in use, engages abutment 32 of female portion 14 and threadedly engages external thread 34 of male portion 12. Slip ring 16 is correspondingly provided with an internal shoulder and internal thread for engaging female portion 14 and male portion 12 respectively (described further below).

Figure 2:
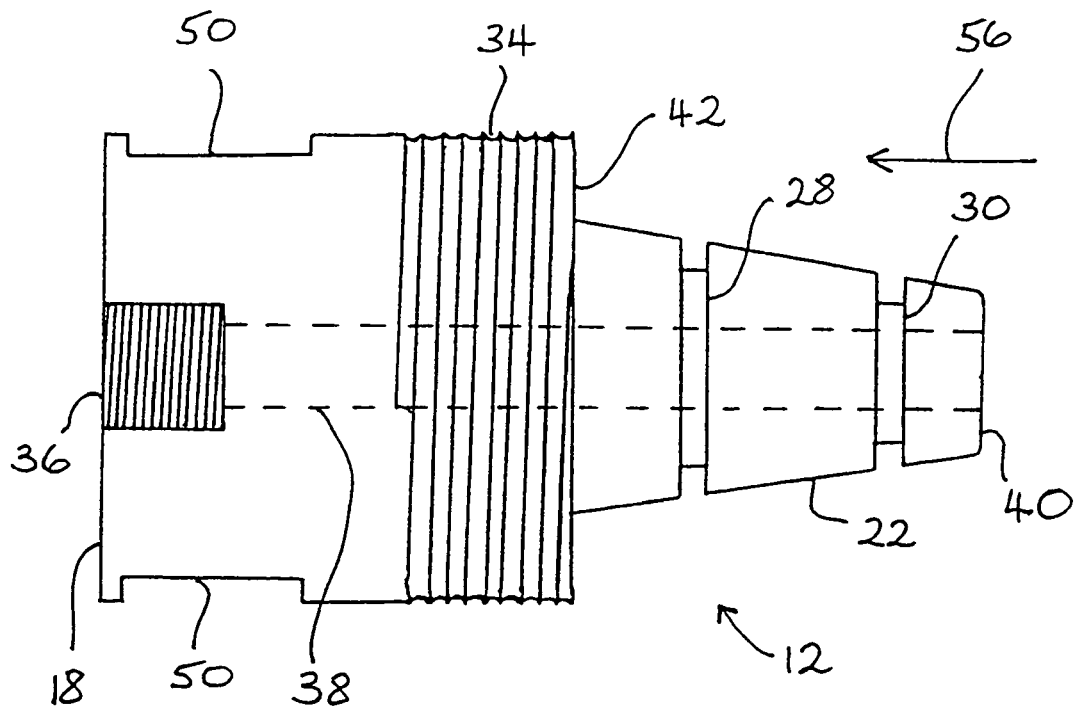
FIG. 2 is a view of the male portion of the connector of FIG. 1.

Male portion 12 is shown in greater detail in FIG. 2 (without O-rings 24 and 26). The male portion 12 includes an internally threaded bore 36 in rear end 18 for coupling to a paint line, and in fluid communication paint channel 38 which extends from bore 36 to the forward tip 40 of frusto-conical nozzle 22. A number of blind bores (not shown) are provided about the base 42 of nozzle 22, for receiving a locking pin provided on female portion 14.

Annular O-ring grooves 28 and 30 are provided in the external surface of nozzle 22 for locating two O-rings so that a very secure fluid seal may be formed between nozzle 22 and female portion 14, though in some applications where a lesser seal may be acceptable, male portion 12 may be provided without O-rings 24 and 26 or O-ring grooves 28 and 30. Alternatively, where a particularly good fluid seal is required, one or more additional O-rings with corresponding O-ring grooves may be provided in male portion 12, on nozzle 22 and/or around the base 42 of nozzle 22. In the latter case, a seal would thereby be formed between the base 42 and the forward surface 54 of abutment 32 of the female portion 14 (shown in FIG. 3).

Figure 3:
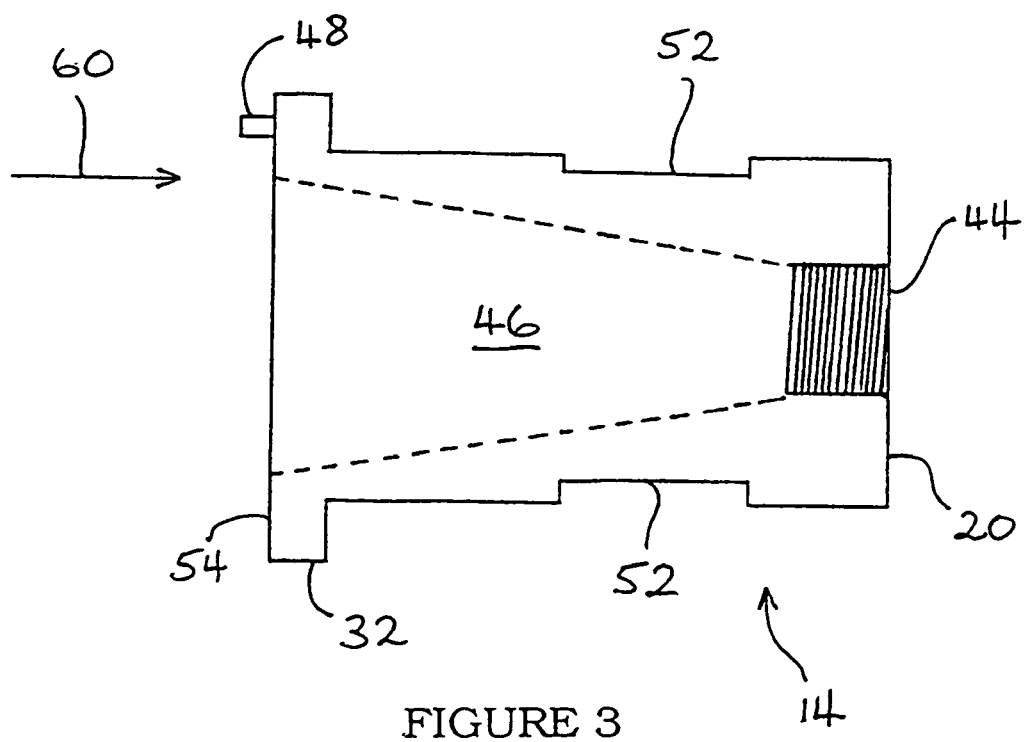
FIG. 3 is view of the female portion of the connector of FIG. 1.

Referring to FIG. 3, female portion 14 also includes an internally threaded bore 44 in its rear end 20 for coupling to a fluid line, in fluid communication with a frusto-conical recess 46 complementary to and for receiving frusto-conical nozzle 22 of male portion 12. Female portion 14 includes an abutment 32 for engaging slip ring 16; in addition, abutment 32 is provided with a locking pin 48 which, in use, is received by one of the plurality of blind bores arranged about the base 42 of nozzle 22 of male portion 12. This engagement prevents the relative rotation of the male and female portion 12 and 14 during the coupling and uncoupling of the connector 10.

As is shown in FIGS. 2 and 3, male portion 12 and female portion 14 are further provided with external flats 50 and 52 respectively, to facilitate the gripping of portions 12 and 14 by a user, especially when decoupling the connector 10. These flats 50 and 52 may also be gripped with a spanner or wrench in the event that additional force is required to couple or decouple the connector 10.

Figure 4:
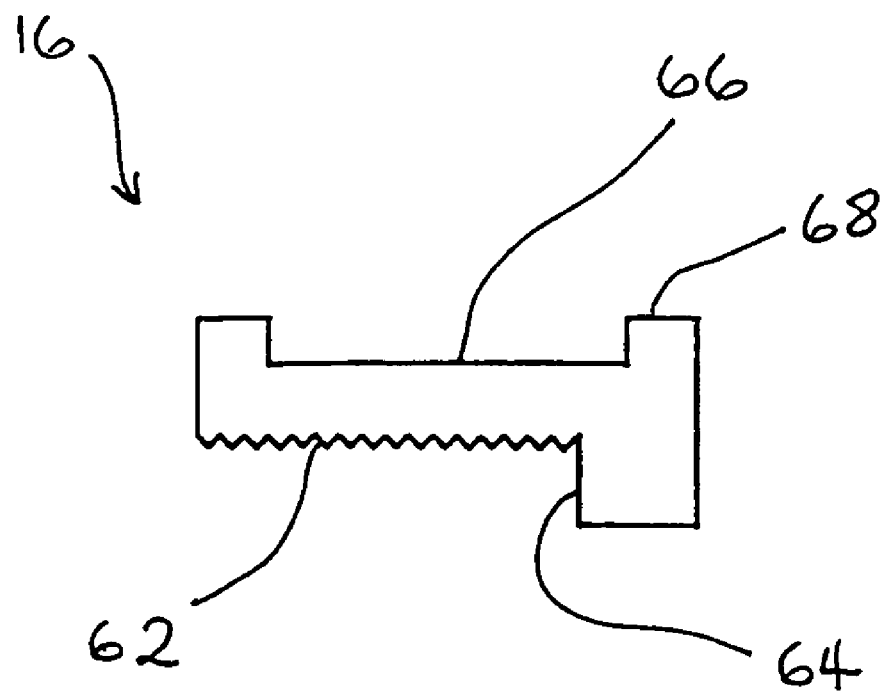
FIG. 4 is view of the slip ring of the connector of FIG. 1.
Figure 4:
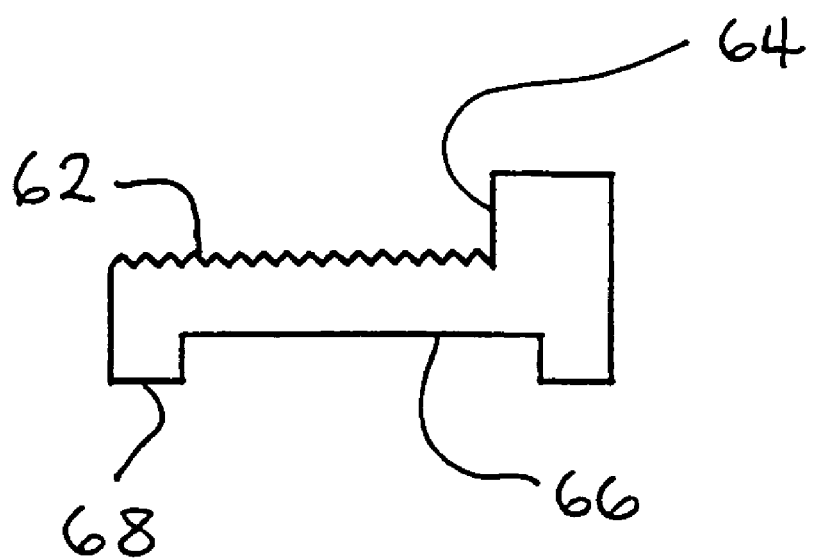

FIG. 4 is a cross-sectional view of slip ring 16. As is apparent from this figure, slip ring 16 is provided with an internal thread 62 for engaging threaded portion 34 of male portion 12, and a flange 64 for engaging abutment 32 of female portion 14. Slip ring 16 is also provided with spanner or wrench flats 66 so that the slip ring may be unthreaded from male portion 12 in order to decouple the connector 10.

The external, generally cylindrical surface 68 of slip ring 16 is preferably cross-hatched to provide additional grip to assist the screwing onto or unscrewing from male portion 12 of slip ring 16.

Figure 5:
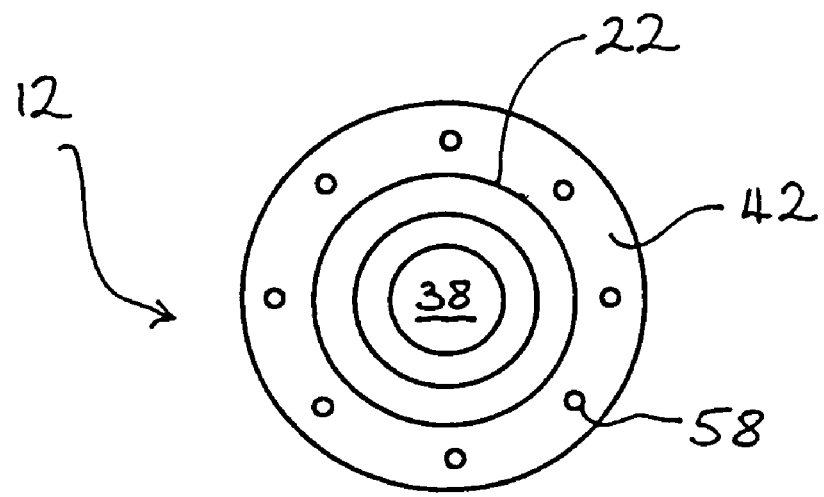
FIG. 5 is a view of the forward end of the male portion of the connector of FIG. 1.

FIG. 5 is a view of male portion 12 in direction 56 (indicated in FIG. 2). As may be more readily seen in this figure, base 42 is provided with a plurality of blind bores 58 for receiving locking pin 48 on female portion 14.

Figure 6:
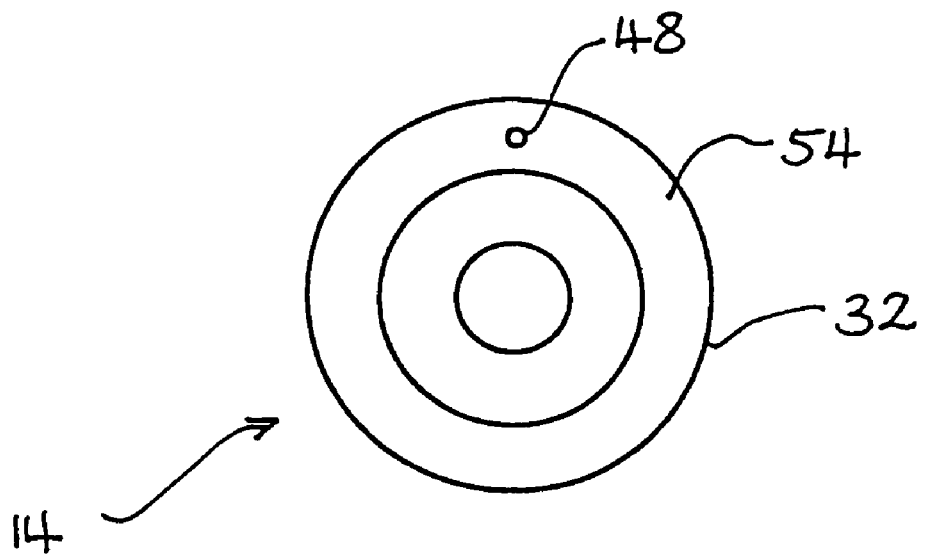
FIG. 6 is a view of the forward end of the female portion of the connector of FIG. 1.

A plurality of bores 58 are provided so that pin 48 may be conveniently located with minimal adjustment of the relative orientation of the male and female portions 12 and 14. FIG. 6 is a comparable view of female portion 14 (in direction 60 shown in FIG. 3). Pin 48 may be formed integrally with female portion 14 or attached to female portion 14 by any suitable method (such as driving pin 48 into a bore provided in abutment 32).

Figure 7:
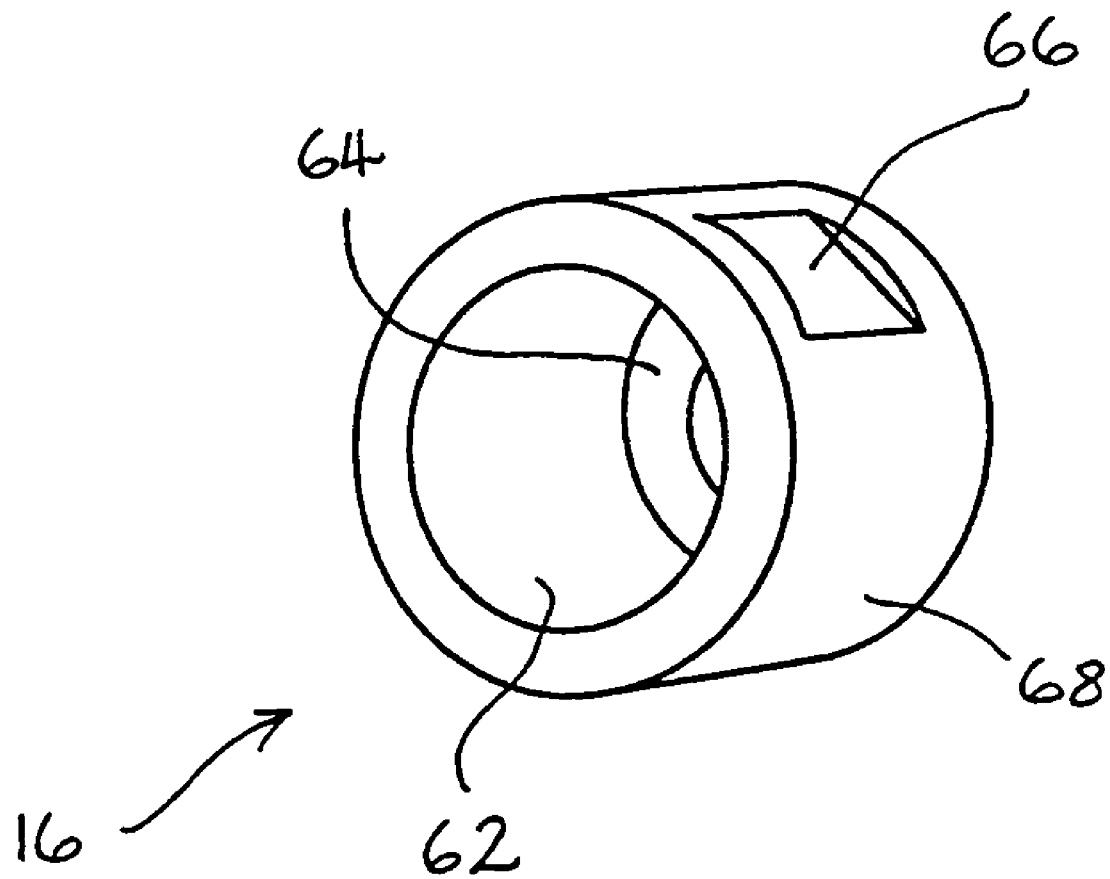
FIG. 7 is a perspective view of the slip ring of the connector of FIG. 1.

FIG. 7 is a perspective view of slip ring 16, in which are shown external, cross hatched surface 68, internal threaded surface 62, flange 64 and one of spanner or wrench flats 66.

Each component of the connector 10 is machined stainless steel, though those in the art will appreciate that many alternative metals (such as aluminium or brass) and other materials (including plastics materials) may be suitable in certain applications.

In use, each of male and female portions 12 and 14 are screwed onto a threaded nipple at the end of a paint line. Nozzle 22 of male portion 12 is then inserted into recess 46 of female portion 14, and locking pin 48 aligned with and inserted into one of corresponding bores 58. Slip ring 16, initially located about female portion 14, is advanced towards male portion 12 and screwed onto male portion 12 by hand. This should provide a sufficiently tight fluid seal for use with a paint line.

This procedure is reversed in order to uncouple the connector 10 although, if difficulty is encountered in unscrewing slip ring 16 from male portion 12 (owing, possibly, to a build up of dried paint), a spanner or wrench may be applied to spanner flats 66 of slip ring 16 to provide additional unscrewing torque.

FIGS. 8A and 8B are exploded and assembled views respectively of a paint line connector 70 according to a further preferred embodiment of the present invention, in conjunction with first and second paint lines 72 and 74.

Connector 70 is, unless otherwise stated, identical to connector 10 of FIG. 1, and includes externally threaded male portion 76, female portion 78 and a coupling means in the form of internally threaded slip ring 80. Male portion 76 and slip ring 80 both have cross-hatched outer surfaces 76a and 80a to facilitate gripping in use, though—for clarity—this cross-hatching is not shown in FIGS. 8A and 8B.

FIGS. 8A and 8B show the connector 70 in conjunction with first and second paint lines 72 and 74, and threaded nipples 82 and 84 for connecting first and second paint lines 72 and 74 to, respectively, male and female portions 76 and 78.

The connector 70 is also provided with a spring lock 86a,b to further resist the inadvertent unlocking of slip ring 80. The spring lock comprises a leaf spring 86a provided on the outer surface of male portion 76, and a corresponding recess 86b provided on the inner surface of slip ring 80. The spring 86a is disposed to project beyond the outer surface 76a of male portion 76 in the direction of the forward tip 88 of the male portion 76 by a distance sufficient to be received within slip ring 80 when the connector 70 is assembled. A groove 90 is provided in the outer surface 76a of male portion 76 behind spring 86a so that spring 86a can be depressed for ready reception by slip ring 80.

In use, an operator engages the male portion 76 and female portions 78, and then locks these together by means of slip ring 80; slip ring 80 is located about the external thread 92 of male portion 76 with spring 86a within slip ring 80, and then screwed onto the external thread 92 until a satisfactory seal is achieved; the external thread 92 is manufactured so that—when the connector 70 is finally assembled—the spring 86a clicks into and is located in recess 86b within slip ring 80. Spring lock 86a,b thereby impedes the inadvertent rotation of slip ring 80. However, spring 86a can be readily disengaged from recess 86b, so that the connector 70 can be undone, by depressing spring 82a at least partially into recess 90, so that spring 86a is no longer within recess 86b. The slip ring 80 can then be unscrewed and the male portions 76 withdrawn from the female portion 78.

Rather than the blind bore/locking pin combination used in connector 10 to impede the relative rotation of male and female portions 76 and 78, male portion 76 includes an anti-turn notch or flat 94 in external thread 92 and female portion 78 has a corresponding anti-turn projection 96 projecting from forward face 98; this projection 96 is essentially an extension of a portion of forward abutment 100 of female portion 78. When assembling the connector 70, male portion 76 is inserted into female portion 78 with the flat 94 and projection 96 aligned. The engagement of flat 94 and projection 96 then impedes and tendency of male portion 76 to rotate relative to female portion 78 during the tightening of slip ring 80, or the use of the connector 70.

Modifications within the spirit and scope of the invention may readily be affected by persons skilled in the art. It is to be understood, therefore, that this invention is not limited to the particular embodiments described by way of example hereinabove.

What is claimed is:

1. A fluid line connector for connecting first and second fluid lines, comprising:
   a male portion having a generally frusto-conical nozzle;
   a female portion having a complementary generally frusto-conical recess for receiving said nozzle;
   a slip ring for coupling said male portion and said female portion when said nozzle is received by said recess and threadedly engaging at least one of said male portion and said female portion; and
   locking means for resisting the undesired or accidental uncoupling of said slip ring and therefore said connector;
   whereby said fluid lines can be connected by attaching said male portion to said first fluid line and said female portion to said second fluid line, locating said nozzle within said recess to form only circumferential sealing engagement between said nozzle and said recess, and coupling said male and female portions by means of said slip ring;
   wherein said locking means includes a leaf spring provided on said male portion and a complementary recess provided in an inner wall of said ring for receiving said leaf spring when said male portion and said female portion are coupled by means of said slip ring, thereby inhibiting the relative rotation of said slip ring with respect to said male portion.

* * * * *